April 22, 1930.    B. R. BENJAMIN    1,755,806
TRACTOR CULTIVATOR
Filed June 30, 1926    3 Sheets-Sheet 2
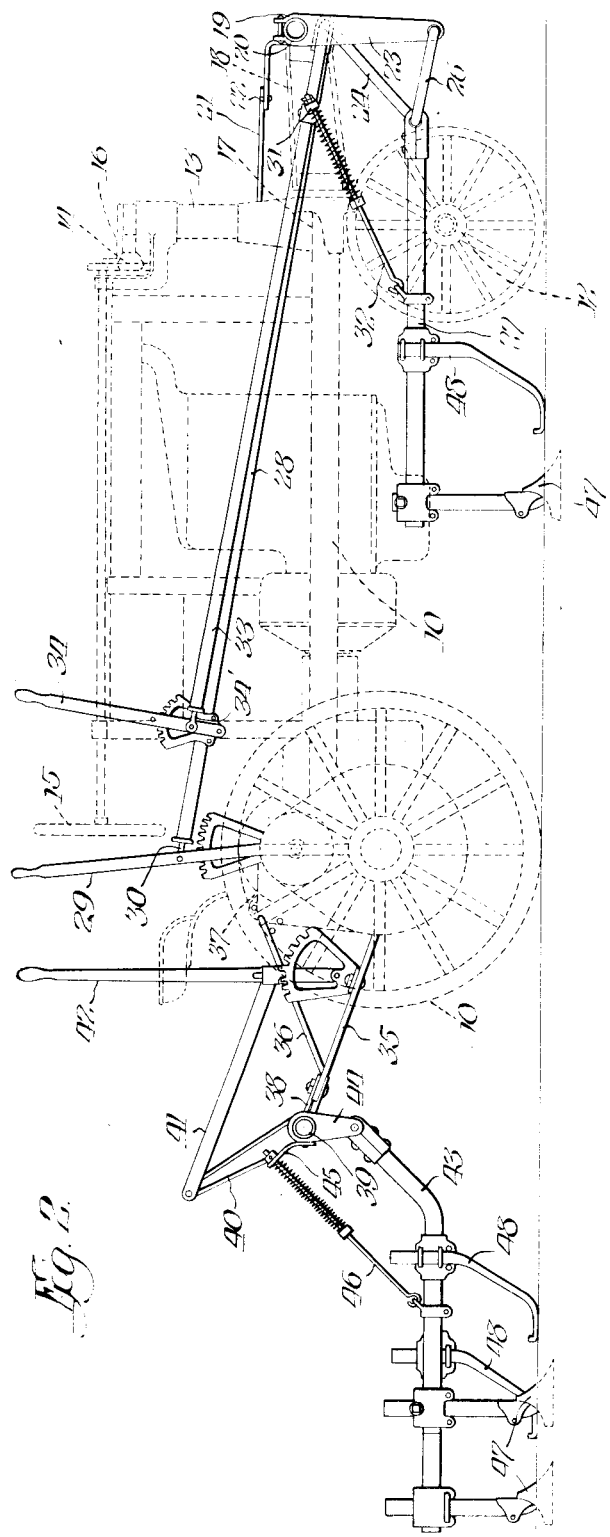
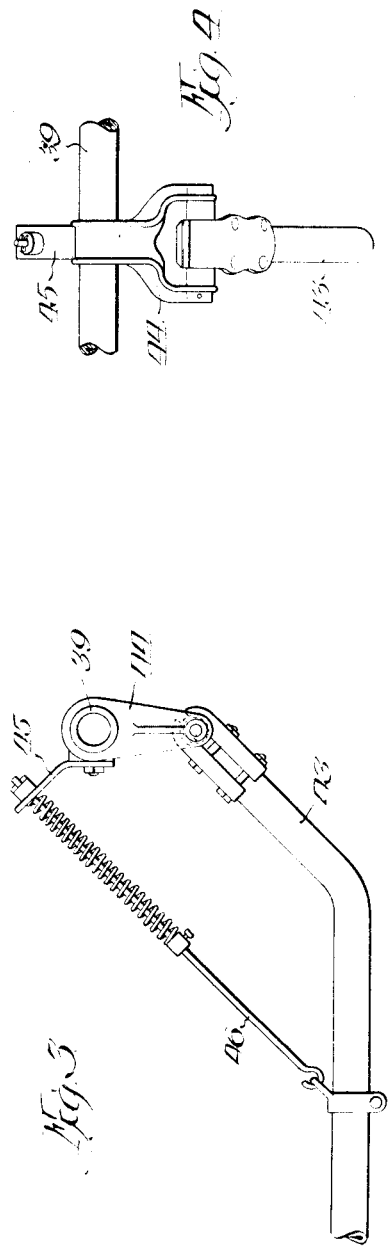
Inventor
Bert R. Benjamin
By H. P. Doonate
Atty

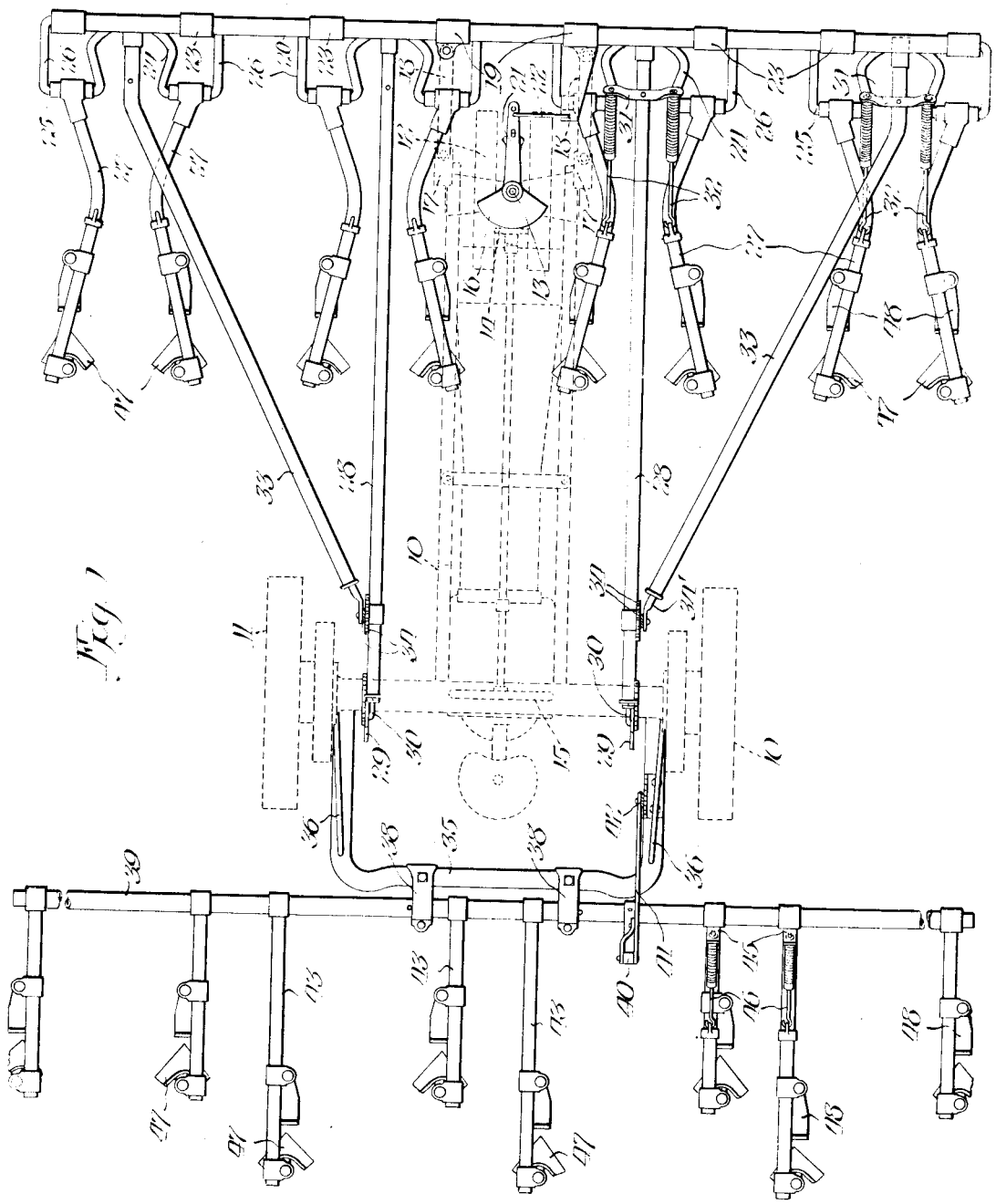

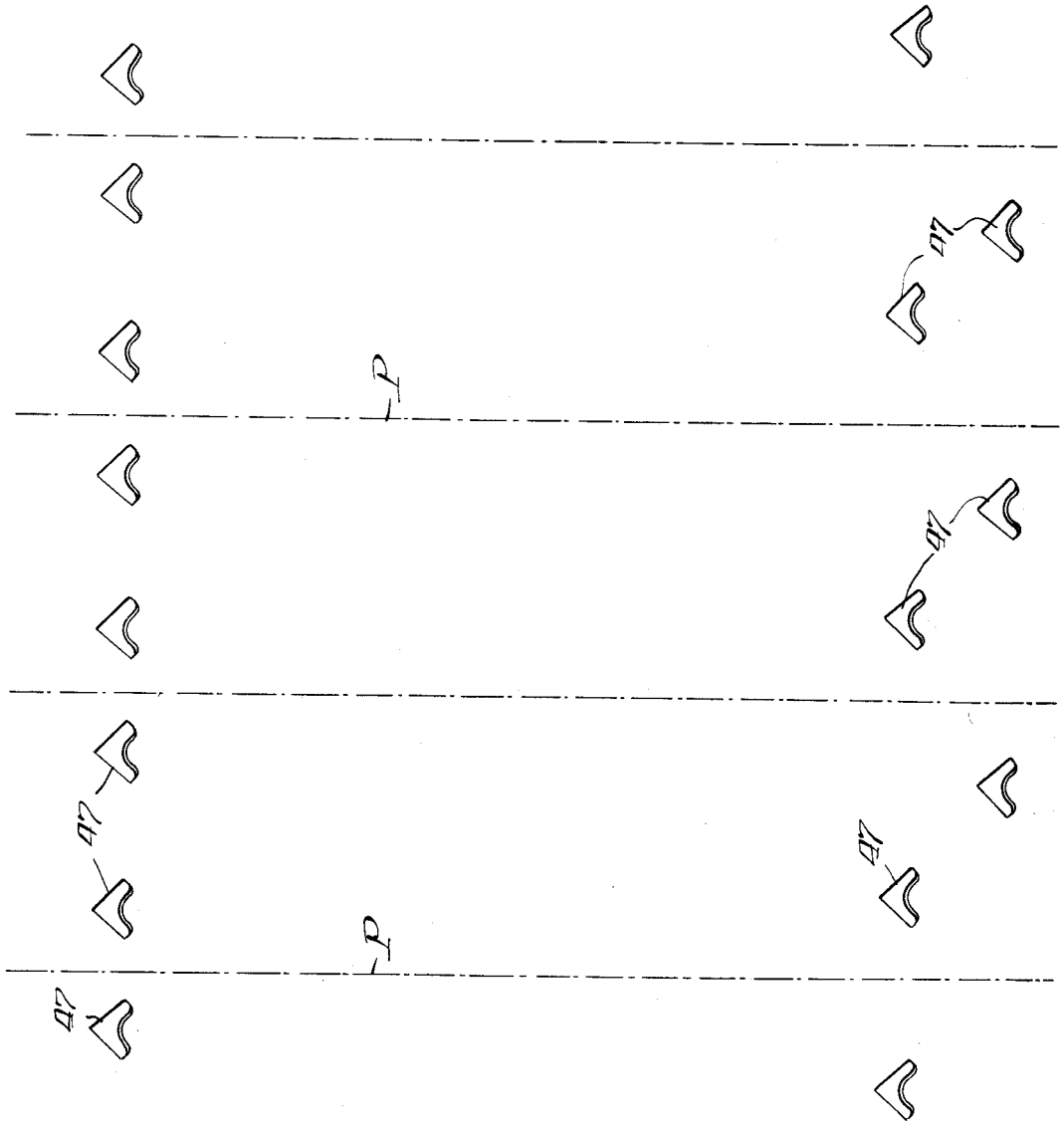

Patented Apr. 22, 1930

1,755,806

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

TRACTOR CULTIVATOR

Application filed June 30, 1926. Serial No. 119,528.

This invention relates to self-propelled farm implements and more particularly to improvements in those of the type employed for working on row crops.

In the practice of so called power farming, or farming by tractor, it has become apparent that full advantage of the power available in some farm tractors is not made use of when working with the known types of single and double row tillage tools. When larger numbers of tillage tools were employed, however, difficulties arose, due to the added weight, concentration of strains, and difficulty of control. In the present invention those and other difficulties have been overcome.

Accordingly one object of the invention has been to provide an efficient and practical tractor tillage implement of the straddle row type capable of working on four or more plant rows at each traverse of the field and composed of individually floating and individually gaged tool beams.

Another object is to provide an arrangement of tillage tools on the tractor such as will divide and distribute the working stresses on the frame of the tractor thereby facilitating control and operation of a multiple row implement.

A further object has been to provide simple control mechanism for lifting and lowering the tillage tools and simple mechanism for guiding them during operation.

Still another object has been to provide a multiple row tillage attachment adapted for use in combination with existing types of tractors and capable of being detached therefrom as desired.

The invention accordingly resides in the organization, details of construction and parts, or mechanical equivalents thereof, hereinafter more specifically described and then defined in the claims.

Referring to the drawings:

Figure 1 is a plan view showing a tractor in combination with a four-row cultivating rig embodying the invention;

Figure 2 is a similar side view;

Figure 3 is a detail side view showing the manner of supporting certain of the drag bars;

Figure 4 is a similar view looking at the structure of Figure 3 from the right; and Figure 5 is a diagrammatic view illustrating the relation of the acts of cultivating tools to the several plant rows.

In the present instance the invention is illustrated as including a tractor of a type having a comparatively narrow main frame 10 supported on widely spaced rear traction wheels 11, adapted to span two plant rows, and on a single centrally position steering truck 12. These parts are shown in dotted lines on the drawings. The steering truck includes an upright steering post 13 journaled in a front cross member on the tractor frame, and the truck is steered through gearing 14, which transmits movement of the steering rod and wheel 15 to a gear sector 16 on the upper end of the standard of the steering truck.

On the forward corners of the tractor frame at each side of the steering post suitable supporting brackets 17 are provided. These brackets cooperate with coupling elements carrying pivotal supporting arms 18. These arms extend horizontally forwardly and at their forward ends are pivoted to clamp brackets 19 supporting a transversely extending implement supporting member 20 which projects laterally beyond each side of the tractor. The pair of arms 18 and cross member 20 just described provide a frame which is laterally shiftable with respect to the tractor. As one preferred means for shifting the member 20 during operation of the implement there is provided a forwardly projecting arm 21 which may be connected to the vertical standard of the steering truck to share its movement, and the outer end of this arm may be connected, as by a link 22, with one of the clamp brackets 19. By this arrangement steering movement of the truck will be communicated to the member 20 to shift it in the direction of steering movement. The supporting and shifting mechanism for the bar 20 may be of substantially the construction disclosed in the prior patent to Benjamin et al. No. 1,539,108, May 26, 1925, to which reference may be had for more detailed description.

In the embodiment of the invention illustrated herein the member 20 carried on the forward portion of the tractor is extended laterally beyond each side of the tractor a sufficient distance to span four plant rows, and at spaced points thereon corresponding to the position of the plant rows the member 20 has secured thereto pairs of depending members 23. On each pair of members 23 there is carried a tool beam support comprising a central upwardly arched portion 24, laterally horizontally extending arms 25 forming integral extensions of the arms of the arch, and angularly bent, forwardly extending horizontal portions 26 extending to a point in substantially the same vertical plane as the upper part of the arch member 24, which is forwardly inclined. The ends of the arms 26 are pivotally connected to the lower ends of the members 23 and the laterally extending portions 25 each carry one of a pair of tool beams 27, the forward ends of which are pivoted thereon. In the present instance four such dragbar supporting structures are disclosed as carried by the bar 20. The lifting and lowering means for the tool beams comprises main lifting bars 28. One of these bars is located at each side of the tractor and is connected at its forward end to the arched portion 24 of one of the inner tool beam supports and at its rear end, to lift actuating mechanism such as the hand lever 29 mounted on the rear of the tractor frame. The lifting bars 28 are preferably tubular and the connection to the hand lever 29 is preferably through a link 30 controlled by a cushion spring (not shown) housed in the end of the bar 28.

At a suitable point on the forward ends of the main lifting bars 28 there is secured a crosshead 31, the ends of which are connected by the usual spring pressed lifting links 32 with the intermediate portion of each tool beam 27 of the pair immediately below. For controlling the lift of the outer dragbars, there is provided at each side of the tractor a secondary lifting bar 33 pivotally connected at its front end to the arch 24 of the outer tool beam support and extending diagonally inwardly to a point near the rear end of the main lifting bar 28 where it is connected to lift actuated mechanism, such as a hand lever and rack 34 mounted at that point on the main lifting bar 28. The secondary lifting bar 33 is connected to its actuating lever 34 by a link 34' as in the case of the main bars 28, which they resemble in construction. At their forward ends the secondary bars 33 also carry crossheads 31 similar to those on the main bars, and these are connected by links 32 to the pair of tool beams thereunder, just as previously described in connection with the bars 28. The arrangement of lifting bars described provides means for lifting the two pairs of tool beams on one side of the tractor simultaneously upon actuation of one of the levers 29, thereby causing the tool beam supports to swing on their pivots on the supports 23 and the portions 25 of said supports that carry the beams to move in a vertical arc about that axis of movement. As the lifting bars are connected by links 32 at an intermediate point on the beams, the effect of longitudinal movement of the bars is to impart a substantially parallel translative movement vertically to the tool beams. Also by the construction disclosed the outer pairs of beams may be lifted alone by manipulation of the lever 34, when desired.

The construction and arrangement so far described constitutes a complete operative structure capable of efficient employment in cultivation of row crops, but in the practice of the invention embodied in the complete organization there is provided at the rear of the tractor complemental cooperating parts of the sets of cultivating tools which are divided between the front and rear supporting members. In the present instance this cooperating structure is illustrated as comprising a U-shaped dragbar 35 having the forward ends of its arms hinged on the lower portion of the axle of the tractor frame and adjustably connected to the tractor through supporting links 36 engageable with a series of openings 37 in the tractor frame. The bight portion of the bar 35 has fixed thereon bearing brackets 38 in which there is journaled a transversely extending supporting member 39 extending laterally beyond the sides of the tractor in parallel relation to the front supporting member 20. Suitable means for rotating this member in its bearings is provided and this may consist of an arm 40 fixed on the member 39 and connected at its end by a lifting link 41 to a lift actuating lever 42 and rack which may be mounted on one of the arms of the bar 35 as shown. At appropriately spaced points on the bar 39 there are connected thereto a series of tool beams 43. As a preferred manner of mounting the beams 43 on the bar 39 there is provided for each beam a depending bracket 44 fixed to the bar 39 and to which the front end of the beam 43 is pivotally connected, as shown in Figure 3. Each bracket 44 has fixed to it an upstanding ear 45 which slidably carries one end of the usual spring pressed lifting link 46, the other end of which is connected to an intermediate point on the beam 43. Each of the tool beams, front and rear, is provided with a cultivating tool such as a shovel 47, and also with individual means for governing the depth to which the shovel may enter the ground. In the present instance this means is illustrated as consisting of a gage shoe or runner 48 which has a shank adjustably connected to the beam at an appropriate point in advance of the shovel. The weight of the individual beams is accordingly carried largely on the gage runner when the beams are in lowered position, and the gage runner governs the depth of penetration of the shovels. This arrangement of individually floating and individually depth gaged shovels permits a self-adjustment of the shovels to inequalities in the soil and particularly co-operates with the widely extended sets of shovels employed for four or more rows, on hillsides or other laterally uneven surfaces.

An important feature of the invention residing in the complete organization is the manner in which the tool beams at the front and rear of the tractor and their associated shovels are arranged with respect to each other. In the ordinary straddle row cultivator structure each beam ordinarily carries three or more cultivator shovels in order to cultivate the entire strip of soil between plant rows. When cultivating more than two rows, however, it becomes undesirable to carry all of the shovels on the front beams of a tractor cultivator of the type herein disclosed, as the front end of the tractor is sometimes overloaded by such an arrangement and it becomes difficult to control the implement. Accordingly in the present invention the forward tool beams are equipped with a lesser number of shovels, preferably one each, and these beams are laterally shiftable in unison for following deviations in the plant rows while the remaining necessary shovels are carried at the rear of the tractor and arranged in cooperative trailing relation in paths adjacent to those of the corresponding shovels at the front. The preferred arrangement is illustrated by Figure 5 where the front shovels are shown as arranged on a transverse line and in pairs adjacent each plant row indicated by the broken lines designated P, and the rear shovels are arranged on transverse lines and in offset trailing relation to the front shovels with the arrangement of the rear shovels such that the intermediate unworked strips of soil left between the paths of the front shovels between rows are engaged and worked by the rear shovels. Incidentally, certain of the shovels in the rear part of the attachment are located in the track of the supporting wheels, and when the implement has passed over the field, no wheel tracks remain. Other shovel arrangements than that illustrated are of course possible.

The structure and organization of the invention, therefore, comprises a pair of implement supporting members one of which is adapted for attachment to the forward portion of a tractor and the other to the rear portion thereof, each member carrying a part of a set or sets of complemental tillage tools.

It will, therefore, be evident that the load on the tractor is divided between its ends and that, as each dragbar carries a small load, the stresses of operation become evenly distributed. It will also be evident that a very efficient multiple row tillage implement is provided from the fact that the front shovels are carried by a laterally shiftable supporting member and are comparatively few in number, thus permitting these shovels to be easily guided during travel of the implement in a manner to follow such deviations as may occur in the plant rows. As these front shovels are the ones nearest the growing plants they are the only ones to which it is necessary to give shifting or dodging movement during operation. The rear shovels, being further from the growing plants, will always remain in the strip between the front shovels irrespective of any slight lateral movement that may be given them while steering. It will also be seen that the front and rear dragbars may be conveniently elevated for transport to and from the field. It is also possible to readily connect and disconnect the supporting members and tractor and to employ either the front or rear member and tools alone if desired.

While only the preferred embodiment of the invention has been described, it is to be understood that it is the intention of the applicant to cover all such changes of the organization and arrangement of parts as fall within the scope of the appended claims.

What is claimed is:

1. In a tillage implement, the combination with a motor propelled vehicle, of front and rear tool supports mounted thereon, a set of cultivating tools disposed in straddle-row relation and having two of the units composing the set connected to the front support with the units positioned to travel immediately adjacent opposite sides of a plant row space, and means for collectively shifting the units carried by said support transversely of the vehicle during travel thereof, and complemental units of the set connected to the rear support.

2. In a tillage implement, the combination with a motor propelled vehicle, of front and rear tool supports mounted thereon, means for shifting one of said supports transversely of the vehicle during travel thereof, and a set of cultivating tools disposed in straddle-row relation and having some of the units composing the set connected to each support, the inner pair of units of the set being connected to the shiftable support.

3. In a tillage implement, the combination with a motor propelled vehicle, of a transversely extended tool support carried by the forward portion of the vehicle, means for shifting said support laterally in the direction of its length during travel of the vehicle, a second transversely extended tool support carried on the rear end of the vehicle, a plurality of pairs of cultivating tools connected to the front support with each pair positioned thereon to straddle parallel plant rows, and other cultivating tools connected to the rear support and positioned to engage the soil in the inter-row space between the paths of the tool pairs on the front support.

4. A tractor cultivator comprising a tractor, an elongated tool supporting member mounted across the front of the tractor and projecting beyond the tread lines of the traction wheels to overhang plant rows adjacent each side of the tractor, a similar tool supporting member mounted across the rear of the tractor, spaced sets of cultivator beams carried by the respective members and arranged thereon in straddle row relation to plant rows between and at each side of the traction wheels, earth working tools carried by the beams, the tools of the front and rear beams being disposed to engage the soil in a succession of parallel paths occupying the entire space between adjacent plant rows, means on each cultivator beam for gauging the operating depth of the tool carried thereby, and means connecting each beam to its supporting member for individual vertical floating movement.

5. A tillage attachment for tractors comprising a U-shaped drawbar the arms of which are adapted for hinged connection on a transverse axis to the rear axle structure of a tractor, means carried by the bar for securing it to the tractor at various positions about the axis of its hinged connection, an implement supporting member rotatively mounted on the bight portion of the drawbar, means on the drawbar for rotatively adjusting said member, and implement carrying beams extending from said member.

6. A tillage attachment for tractors comprising a U-shaped drawbar the arms of which are adapted for hinged connection on a transverse axis to the rear axle structure of a tractor, means carried by the bar for securing it to the tractor at various positions about the axis of its hinged connection, an implement supporting member rotatively mounted on the bight portion of the drawbar, means on the drawbar for rotatively adjusting said member, a series of tillage tools having individual beams pivotally connected to said member to move vertically, and means for limiting downward movement of each beam.

7. A tillage attachment for tractors comprising a U-shaped drawbar the arms of which are adapted for hinged connection on a horizontal axis to the rear axle structure of a tractor, suspension links carried by the bar for securing it to the tractor at various positions about the axis of its hinged connection, spaced bearing brackets secured to the bight portion of the bar, an implement supporting member journaled in said brackets and extending laterally beyond the drawbar, means mounted on the drawbar for rotatively adjusting the implement supporting member, a series of tillage tools having individual beams pivotally connected to said member to move vertically, said tools being spaced to straddle a plurality of plant rows spanned by the supporting member, means for limiting downward movement of each beam, and means for yieldingly resisting upward movement thereof.

In testimony whereof I affix my signature.

BERT R. BENJAMIN.